Nov. 28, 1939.
C. PALMIERI
2,181,833
BEATER OR MIXER
Filed July 1, 1938
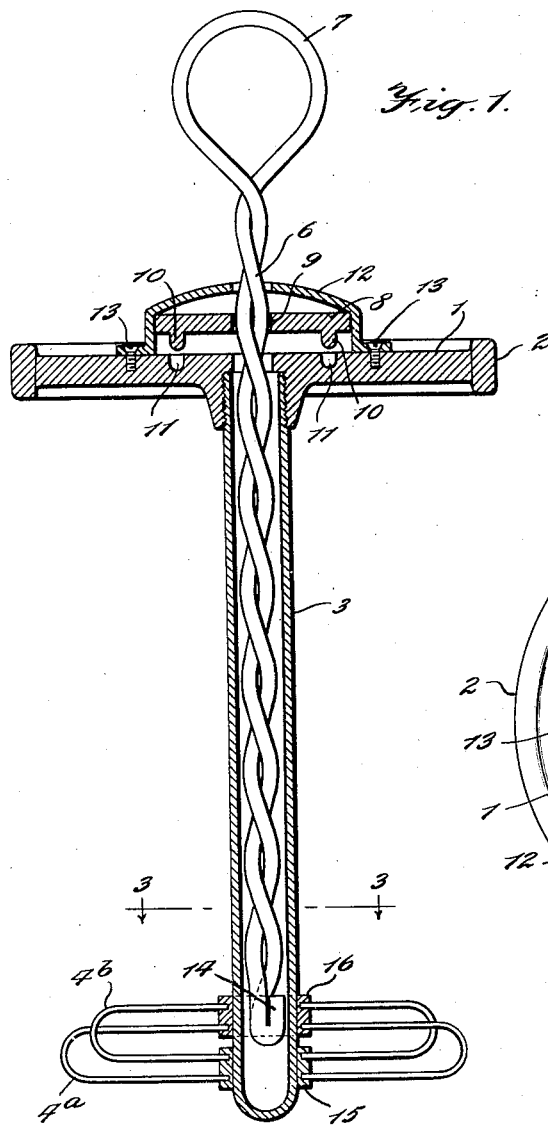
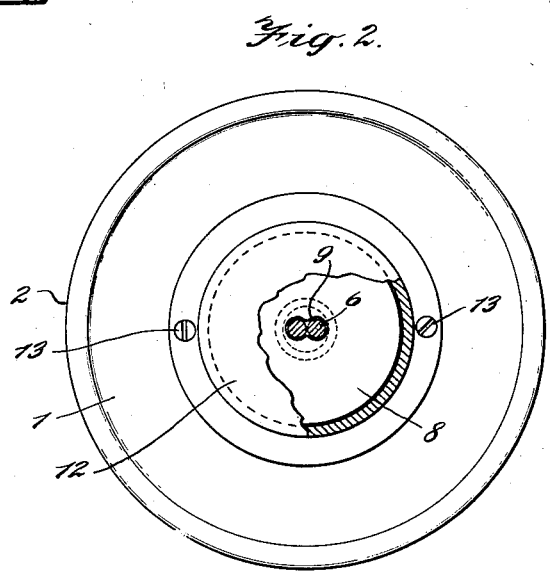
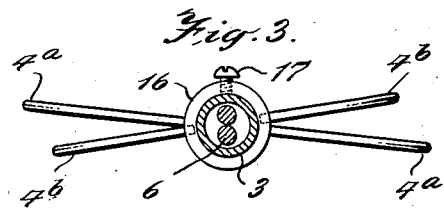
INVENTOR.
Cesare Palmieri
BY Waldo M. Chapin
ATTORNEYS Patented Nov. 28, 1939

2,181,833

UNITED STATES PATENT OFFICE 2,181,833

BEATER OR MIXER

Cesare Palmieri, New York, N. Y., assignor of thirty three and one-third per cent to Marie Milano and thirty three and one-third per cent to Louisa Corsaro and one-fifth to Waldo M. Chapin, New York, N. Y.

Application July 1, 1938, Serial No. 216,860

1 Claim. (Cl. 259—135)

My invention relates generally to devices for mixing liquids or semi-liquids, and more specifically to a manually operated kitchen utensil for beating eggs, whipping cream, mixing dressings, and the like.

The primary object of my invention is to provide a device of the character aforesaid which may be readily cleansed and easily maintained in sanitary condition.

Another object is the elimination in such a structure of gears and like parts which are subject to deleterious wear, and to provide a device from a minimum of parts.

A further object is the provision of such a device which may be actuated by one hand of the operator.

Another object is the provision of such a device which will possess greater efficiency than the conventional devices employed at the present time for like purposes.

A further and important object is the cheapness of construction of the constituent parts and simplicity of assembly of the said parts.

Other objects will appear as the specific description of my invention develops, taken in connection with the accompanying drawing, in which Fig. 1 is a longitudinal, sectional view of a mixing device embodying my invention;

Fig. 2 is a top plan view thereof as seen in the absence of one of the structural elements thereof, a part of the structure being broken away to disclose an inner detail, and Fig. 3 is a plan view taken on the line 3—3 of Fig. 2.

Referring now to the drawing, my invention comprises a fly-wheel indicated by the reference character 1 which is made of any suitable metal and which may desirably have a thickened, annular, heavy peripheral ring as 2 to ensure the continued rotation of the fly-wheel once it has been given a spinning impetus in a manner to be hereinafter described.

A member 3 is axially atached to the under side of the fly-wheel 1 as by means of the threaded connection shown. This member 3, for purposes of illustration, is shown as a hollow, tube-like structure, but it will be apparent that other structures than the tubular embodiment illustrated may be employed without departing from the spirit and scope of my invention.

The member 3, at its lower extremity, is provided with beater elements 4a and 4b which will be hereinafter more fully described.

Designed for reciprocal movement through the aperture 5 in the fly-wheel 1 and into the tubular member 3 is an actuator or driver shaft 6 provided with a handle 7, which shaft comprises a pair of wires so associated in twisted relationship one with the other as to provide an exterior thread of gentle pitch.

Loosely mounted above the fly-wheel 1 in concentrical relationship therewith is a disk-like member 8 the function of which is that of a clutch. This member 8 is provided with a centrally disposed orifice 9, which, as shown in Fig. 2, has somewhat the configuration of a figure 8, designed to conform to the cross-sectional shape of the twisted wire driver shaft 6. This shaft 6 may therefore be regarded as an exteriorly threaded bolt and the disk-like clutch member 8 is an interiorly threaded nut loosely fitting upon the bolt.

The clutch member 8 is provided on its under side and the fly-wheel 1 on its upper side with any cooperating means whereby the two members may be secured one to the other and driven together. As shown for purposes of illustration the clutch member is provided wtih a plurality of lugs 10 and the fly-wheel with a similar number of indentations 11, which lugs and indentations are designed to cooperate to lock the clutch and fly-wheel together so that when the former is rotated, the latter will partake of the same rotational movement. Any other suitable means for locking these two said parts together may of course be employed.

Attached to the upper side of the fly-wheel 1 and extending over the clutch 8 is a housing 12 shown as being attached to the fly-wheel by the screws 13 but which of course may be attached by any other suitable means. The purpose of this housing is to limit the movement upwardly of the clutch member 8 and in order to serve that purpose need not be a complete housing as shown.

In operation the actuator shaft 6 is grasped by the handle 7 and pulled upwardly, carrying upwardly with it the clutch 8 until the latter contacts with the under side of the housing 12, and thereafter the clutch, whose lugs 10 are retracted from the indentations 11, continues to spin idly until the actuator shaft has been pulled out to the limit of its stroke. At the lower extremity of the actuator shaft 6 the two wire elements thereof are bent back upon each other as at 14 to constitute a limit stop to prevent the shaft from being pulled through the clutch member.

When the shaft 6 has reached the upper limit of its stroke, it is thereupon pushed downwardly, carrying with it the clutch 8 into locking engagement with the fly-wheel, and this downward thrust upon the shaft 6 with the consequential rotation of the clutch, imparts a like rotational impetus to the fly-wheel and consequently to the beater members.

It follows therefore that with each downward thrust exerted upon the driver shaft 6, the fly-wheel will be given a rotative impetus, always in the same direction, and that the upward pull upon the shaft will not disturb the continuity of travel of the fly-wheel but merely acts to position the actuator shaft for another downward thrust which imparts to the fly-wheel a fresh rotational impetus, all of which reciprocatory movements may be accomplished by the use of one hand.

Referring now more particularly to the beater members of which two looped pairs are shown, respectively indicated by the reference characters 4a and 4b, those members are shown as radiating from the two collars 15 and 16 which surround the driven shaft member 3. The beaters 4a radiate outwardly from the collars for a suitable distance while the beaters 4b extend radially outwardly a slightly shorter distance, and both sets of beaters are so mounted that when the device is actuated in clockwise direction the longer pair 4b will be slightly in advance of the shorter pair 4a. This arrangement has been found in practice to give excellent results, but it will be understood that any other arrangement of beaters may be employed within the purview of my invention.

One end of each beater loop is shown as being attached to the collar 15 and the other end thereof to the collar 16, as clearly appears from the drawing. The collar 15 is preferably fixedly attached to the driven member 3, while the collar 16 may desirably be slidably mounted upon the shaft 3 for adjustment upwardly and downwardly thereof to thereby position the loops at their attached bases to and from each other. This feature of adjustability has been found advantageous for purposes of varying the time period necessary for effecting a mixture. For purposes of quick mixing, such, for instance as the whipping of cream, it has been found that the best results are obtained when the two collars 15 and 16 are positioned relatively close to each other, but when elements are being combined which it is desirable to mix more slowly, the collar 16 should be moved upwardly from the collar 15, and the more the former is spaced from the latter, the slower will be the mixing operation. For the fixation of the collar 16 in any desired position a set screw 17 is provided.

What I claim is:

A readily portable beater comprising a rotor element and an operator element; said rotor element including an elongated tube intended to extend downward into the contents of a vessel and closed to exclude its contents, a beater device fast on said tube near its lower end, a disk-like fly wheel fast on said tube and arranged to rotate above the level of the materials, and a one-way clutch device having its driven member fast on the tube above said level; and said operator element comprising a shaft disposed slidingly within the tube spiralled to engage the driving member of said clutch and cause one-way operation of said rotor when the operator element is reciprocated up and down by one hand of the user.

CESARE PALMIERI.